US011919753B2

(12) United States Patent
Bryan et al.

(10) Patent No.: US 11,919,753 B2
(45) Date of Patent: *Mar. 5, 2024

(54) WINCH TIGHTENING MECHANISM

(71) Applicant: ARCOSA MARINE PRODUCTS, INC., Dallas, TX (US)

(72) Inventors: Clint Bryan, Bethpage, TN (US); Arnold Peek, Madison, TN (US)

(73) Assignee: ARCOSA MARINE PRODUCTS, INC., Dallas, TX (US)

(*) Notice: Subject to any disclaimer, the term of this patent is extended or adjusted under 35 U.S.C. 154(b) by 462 days.

This patent is subject to a terminal disclaimer.

(21) Appl. No.: 16/937,727

(22) Filed: Jul. 24, 2020

(65) Prior Publication Data

US 2020/0354200 A1 Nov. 12, 2020

Related U.S. Application Data

(63) Continuation of application No. 16/389,303, filed on Apr. 19, 2019, now Pat. No. 10,752,476, and a continuation of application No. 15/241,794, filed on Aug. 19, 2016, now Pat. No. 10,266,377.

(60) Provisional application No. 62/326,320, filed on Apr. 22, 2016.

(51) Int. Cl.
*B66D 5/34* (2006.01)
*B66D 1/06* (2006.01)

(52) U.S. Cl.
CPC .................................... *B66D 1/06* (2013.01); *B66D 5/34* (2013.01)

(58) Field of Classification Search
CPC ... B66D 1/02; B66D 1/04; B66D 1/06; B66D 5/34
See application file for complete search history.

(56) References Cited

U.S. PATENT DOCUMENTS 1,038,800 A * 9/1912 Tallon .................. E21B 19/008 254/365
2,042,762 A * 6/1936 Berby ...................... B66D 1/06 477/203
2,496,249 A * 1/1950 Lawrence ............... F16G 11/12 254/222
2,710,765 A * 6/1955 Arens .................. E21B 11/005 294/50.8
2,946,563 A * 7/1960 Eaton ...................... F16G 11/12 410/37
(Continued)

*Primary Examiner* — Sang K Kim
*Assistant Examiner* — Nathaniel L Adams
(74) *Attorney, Agent, or Firm* — BAKER BOTTS L.L.P.

(57) ABSTRACT

According to some embodiments, a winch tightening apparatus comprises a mounting plate; a first moment arm coupled to the mounting plate and configured to provide leverage for rotating the mounting plate; and a pawl comprising a first end and a second end. The first end is pivotally coupled to the mounting plate such that the second end pivots to engage a ratchet gear when the mounting plate is rotated in a first direction and pivots to disengage the ratchet gear when the mounting plate is rotated in a second direction opposite the first direction. Some embodiments include a second moment arm coupled to the mounting plate and configured to provide leverage for rotating the mounting plate. Some embodiments include a counterweight coupled to the mounting plate and positioned to rotate the mounting plate in the second direction.

17 Claims, 13 Drawing Sheets

(56) References Cited

U.S. PATENT DOCUMENTS

| | | | | | |
|---|---|---|---|---|---|
| 2,992,811 | A * | 7/1961 | Turner | B66F 7/02 254/4 B |
| 3,581,586 | A * | 6/1971 | Blackburn | B66D 1/06 74/159 |
| 3,597,995 | A * | 8/1971 | Hawkins | B66D 3/14 74/491 |
| 3,799,005 | A * | 3/1974 | Koehler | B66D 1/04 254/354 |
| 3,799,055 | A * | 3/1974 | Irish, Jr. | F42B 5/08 102/202.8 |
| 4,456,227 | A * | 6/1984 | Notenboom | B66D 1/06 254/350 |
| 4,591,029 | A * | 5/1986 | Da Foe | B66D 5/34 188/134 |
| 8,974,159 | B1 * | 3/2015 | Ammann | B60P 7/0846 410/97 |
| 9,004,456 | B2 * | 4/2015 | Topping, Jr. | B66D 1/54 254/222 |
| 10,266,377 | B2 * | 4/2019 | Bryan | B66D 1/06 |
| 10,752,476 | B2 * | 8/2020 | Bryan | B66D 5/34 |
| 10,850,957 | B2 * | 12/2020 | Perrin | B25B 23/0028 |
| 2015/0197413 | A1 * | 7/2015 | Doig | B63C 3/02 248/124.2 |
| 2017/0305728 | A1 * | 10/2017 | Bryan | B66D 5/34 |
| 2017/0362066 | A1 * | 12/2017 | Grapes | B66D 1/06 |
| 2019/0241410 | A1 * | 8/2019 | Bryan | B66D 1/06 |
| 2020/0354200 | A1 * | 11/2020 | Bryan | B66D 5/34 |

* cited by examiner

WINCH TIGHTENING MECHANISM

RELATED APPLICATIONS

This application is a continuation under 35 U.S.C. § 120 of U.S. continuation application Ser. No. 16/389,303 which is a continuation under 35 U.S.C. § 120 of U.S. patent application Ser. No. 15/241,794 which claims priority to U.S. Provisional Patent Application No. 62/326,320 filed Apr. 22, 2016, all of which are hereby incorporated by reference in their entirety.

TECHNICAL FIELD OF THE INVENTION

This disclosure generally relates to winches, and more particularly to a winch tightening mechanism.

BACKGROUND

Winches for tensioning and paying out wire line or rope are well known in the marine industry. Deck hands use manual or powered winches to assist with tasks such a loading or unloading cargo or connecting two vessels together. Marine vessels may also maintain their position in relation to a mooring structure, such as a dock, by using winches.

The barge transportation industry uses winches to connect barges to each other in a barge tow and to connect the barge tow to a tow vessel. Each barge typically has two or four deck-mounted, manually-operated winches. A deck hand connects the winch line to a deck fitting on an adjacent barge and then ratchets the line tight, connecting the barges together. To disassemble the barge tow, the deck hand releases tension on the winch and pays out the line. A tow vessel typically connects to the rear of the barge tow in a similar manner. During transportation, deck hands may need to disassemble and reassemble the barge tow to pass through locks or navigate constricted waterways. Deck mounted winches may also secure a barge to a dock during loading or unloading operations.

In a typical winch, a geared drive mechanism typically rotates a winch drum to spool a wire line around the winch drum. As the drive mechanism rotates the winch drum, a winch locking gear, such as a pawl and ratchet gear, maintains tension on the winch line by preventing the winch drum from rotating in the opposite direction. Conventional manual winches use a hand wheel or bar shaped handle to turn the drive mechanism. For a long period of time, manual winches were operated primarily by a large spoked handwheel. The long spokes of the large handwheel provided locations for a winch operator to place both his hands and feet. The spokes provided large moment arms to assist with tightening the winch. For example, a winch operator might take up a majority of the winch line by spinning the spoked handwheel with only his hands. To finish tightening the winch to a desired line tension, the winch operator may attempt w rotate the winch by a few more teeth of the winch locking gear. To provide the leverage for the extra rotation, the winch operator may place both hands along the top of the handwheel and a foot against a spoke at the bottom of the handwheel to use his relatively stronger leg muscles to assist with the final tensioning. In this way the operator is both pulling with his arms and pushing with his leg to generate tension.

While use of the large spoked handwheel may be effective, it can be dangerous if used improperly. Accordingly, the winch industry has transitioned to solid handwheels. A solid handwheel is typically smaller than the spoked handwheel to conserve weight. The smaller handwheel diameter and solid design, however, make it difficult for a winch operator to generate even half the line tension as they were able to generate with a spoked handwheel.

In response, the winch industry relies on ratchets with long pipe extensions to generate the leverage necessary for the desired line tension. The pipe extension, however, is generally too long to leave in place during normal operation. Thus, the pipe extension is removed and stowed when not in use. Because the pipe extension is not fixed to the winch, for each tightening operation the operator locates and attaches the pipe extension, which adds extra time to the operation. Worse, the pipe extension may get lost. Furthermore, an operator often uses improper motion with the pipe extension, which can cause operators to overextend and suffer sometimes serious injuries.

SUMMARY OF THE INVENTION

Particular embodiments described herein include a limited motion and pedal indexing mechanism that may incorporate upper and lower body strength for tightening a mechanical winch both quickly and safely. Particular embodiments include a winch ratchet mechanism with the benefits of a spoked handwheel without the safety disadvantages. Particular embodiments provide ergonomic benefits to the winch operator which can reduce injury and improve operator efficiency.

According to some embodiments, a winch apparatus comprises a winch housing; a winch drum rotationally coupled to the winch housing by a drive shaft; a ratchet gear coupled to the drive shaft for rotating the winch drum; a hub coupled to the winch housing and positioned concentrically around the ratchet gear; a mounting plate coupled to the hub and configured to rotate around an axis of the hub; a first moment arm coupled to the mounting plate and configured to provide leverage for rotating the mounting plate; and a pawl comprising a first end and a second end. The first end of the pawl is pivotally coupled to the mounting plate and positioned such that the second end of the pawl engages the ratchet gear when the mounting plate is rotated in a first direction and disengages the ratchet gear when the mounting plate is rotated in a second direction opposite the first direction. Some embodiments include a second moment arm coupled to the mounting plate and configured to provide leverage for rotating the mounting plate.

In particular embodiments, the hub comprises a slot in a portion of its circumference, and the pawl pivotally coupled to the mounting plate is positioned such that the second end of the pawl passes through the slot in the hub to engage the ratchet gear when the mounting plate is rotated in the first direction and the second end of the pawl lifts out of the slot in the hub to disengage the ratchet gear when the mounting plate is rotated in the second direction.

Particular embodiments include a counterweight coupled to the mounting plate. The counterweight is positioned to rotate the mounting plate in the second direction to automatically disengage the pawl from the ratchet gear. The counterweight may be gravity operated or spring operated.

Particular embodiments include a slot in the mounting plate and a stop pin coupled to the winch housing and extending into the slot in the mounting plate such that the stop pin limits the rotational motion of the mounting plate.

In particular embodiments, the first moment arm comprises an enclosed handle. The first moment arm may comprise a first portion coupled to the mounting plate and a second portion coupled to the first portion. The second portion may be detachable from the first portion. The first moment arm may comprise a shear point.

According to some embodiments, a winch tightening apparatus comprises a mounting plate; a first moment arm coupled to the mounting plate and configured to provide leverage for rotating the mounting plate; and a pawl comprising a first end and a second end. The first end is pivotally coupled to the mounting plate such that the second end pivots to engage a ratchet gear when the mounting plate is rotated in a first direction and pivots to disengage the ratchet gear when the mounting plate is rotated in a second direction opposite the first direction. Some embodiments include a second moment arm coupled to the mounting plate and configured to provide leverage for rotating the mounting plate. Some embodiments include a counterweight coupled to the mounting plate and positioned to rotate the mounting plate in the second direction.

In particular embodiments, a hub is positioned concentrically around the ratchet gear. The hub comprises a slot in a portion of it circumference. The pawl pivotally coupled to the mounting plate is positioned such that the second end of the pawl passes through the slot in the hub to engage the ratchet gear when the mounting plate is rotated in the first direction and the second end of the pawl lifts out of the slot in the hub to disengage the ratchet gear when the mounting plate is rotated in the second direction.

In particular embodiments, the first moment arm comprises an enclosed handle. The first moment arm may comprise a first portion coupled to the mounting plate and a second portion coupled to the first portion. The second portion may be detachable from the first portion. The first moment arm may comprise a shear point.

According to some embodiments, a method comprises providing a winch housing and a winch drum, the winch drum rotationally coupled to the winch housing by a drive shaft; positioning a hub concentrically around the driveshaft; coupling the hub to the winch housing; and rotationally coupling a winch tightening apparatus to the hub. The winch tightening apparatus comprises a. first moment arm coupled to a mounting plate and configured to provide leverage for rotating the mounting plate, and a pawl comprising a first end and a second end. The first end is pivotally coupled to the mounting plate such that the second end pivots to engage ratchet gear when the mounting plate is rotated in a first direction and pivots to disengage the ratchet gear when the mounting plate is rotated in a second direction opposite the first direction.

In particular embodiments, the method further comprises coupling the ratchet gear to the drive shaft. The method may include coupling a stop pin to the winch housing positioned such that the stop pin extends into a slot in the mounting plate to limit the rotational motion of the mounting plate.

In particular embodiments, the hub comprises a slot in a portion of its circumference. The pawl pivotally coupled to the mounting plate is positioned such that the second end of the pawl passes through the slot in the hub to engage the ratchet gear when the mounting plate is rotated in the first direction and the second end of the pawl lifts out of the slot in the hub to disengage the ratchet gear when the mounting plate is rotated in the second direction.

As a result, particular embodiments of the present disclosure may provide numerous technical advantages. For example, particular embodiments improve a winch operator's efficiency because the operator may tension the winch line faster than conventional methods where the operator had to locate and install a pipe extension. The winch line may pay out easier, reducing operator fatigue.

A winch operator may use both his arms and legs on two moment arms, generating a moment couple, which enables the operator to generate more tension than with a simple lever arm. Accordingly, particular embodiments enable the winch operator to generate greater line tension than with conventional methods.

Particular embodiments provide safety advantages. For example, particular embodiments significantly reduce the range of motion an operator uses to generate line tension, which may reduce a risk of overstressing muscles from working in an awkward position. Particular embodiments reduce the ability of the winch to return the energy of the winch line tension back to the operator. A winch operator may use the embodiments described herein in an ergonomic and adjustable manner.

During transportation of a barge tow (comprising fifteen, thirty-five, or more barges assembled together), an operator may need to disassemble and reassemble the barge tow to pass through locks or navigate constricted waterways multiples times per trip. Thus, even small improvements in operator efficiency (e.g., faster winch operations, reduced operator fatigue, etc.) are multiplied and amount to significant gains over the course of a single barge trip. Particular embodiments of the present disclosure may provide some, none, all, or additional technical advantages.

BRIEF DESCRIPTION OF THE DRAWINGS

A more complete and thorough understanding of the particular embodiments and advantages thereof may be acquired by referring to the following description taken in conjunction with the accompanying drawings, in which like reference numbers indicate like features, and wherein.

DETAILED DESCRIPTION

Conventional mechanisms for tensioning a winch line, such as the closed handwheel, may not provide enough leverage to adequately tension a winch line. Long pipe extensions used to generate additional leverage can cause an operator stress, fatigue, or even injury because of the operator's forceful exertions in sometimes awkward positions. Furthermore, locating, attaching, and removing the pipe extension adds time to each winch operation, which reduces operator productivity.

Particular embodiments obviate the problems described above and include a limited motion and pedal indexing mechanism to incorporate upper and lower body strength for tightening a mechanical winch both quickly and safely. Particular embodiments include a winch ratchet mechanism with the leverage benefits of a spoked handwheel, but without the safety disadvantages. Particular embodiments provide ergonomic benefits to the winch operator which can reduce injury.

Particular embodiments of the invention and its advantages are best understood by reference to FIGS. 1 through 11 wherein like reference numbers indicate like features.

Figure 1:
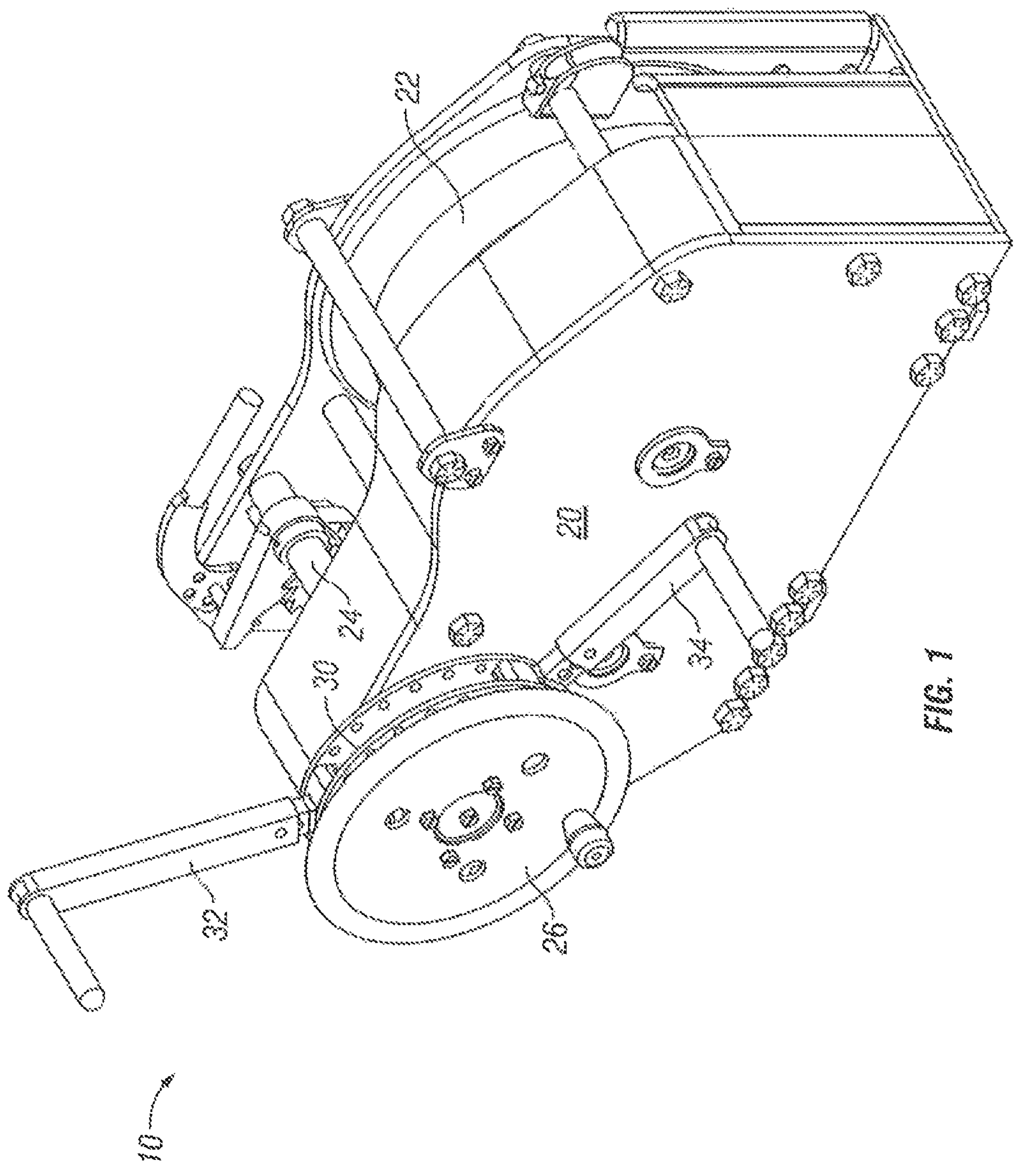
FIG. 1 is a perspective schematic of a winch with an example winch tightening mechanism, according to some embodiments.

FIG. 1 is a perspective schematic of a winch with an example winch tightening mechanism, according to some embodiments. Winch 10 includes winch housing 20, which houses winch drum 22 for spooling winch line. Winch drum 22 is rotationally mounted within winch housing 20. Drive shaft 24 drives a geared drive mechanism coupled to winch drum 22 to rotate winch drum 22. Closed handwheel 26 is coupled to drive shaft 24. A winch operator rotates closed handwheel 26 to operate the winch.

In particular embodiments, winch 10 includes winch tightening apparatus 30. Winch tightening apparatus 30 includes upper arm 32 and may include lower arm 34. Winch tightening apparatus 30 is coupled to drive shaft 24 via a ratchet gear and pawl (described in more detail below). Upper arm 32 may be referred to as a first moment or first moment arm and lower arm 34 may be referred to as a second moment or second moment arm. Together, these two moments create a couple. The couple created by upper arm 32 and lower arm 34 may be used to rotate drive shaft 24. Using upper arm 32 and lower arm 34, a winch operator may rotate winch tightening apparatus 30 to apply tension to the winch line when operating the winch.

For example, when tensioning a winch line, an operator may use closed handwheel 26 to take up a majority of the winch line. Closed handwheel 26 may also be referred to as a primary tensioning mechanism. When closed handwheel 26 no longer provides enough leverage to continue tensioning the winch line, the operator may use winch tightening apparatus 30 to apply the final tension. Winch tightening apparatus 30 may also be referred to as a secondary tensioning mechanism. The operator may pull upper arm 32 with one or both hands and may push down on lower arm 34 with a foot.

The couple created by upper arm 32 and lower arm 34 is able to generate more winch line tension than closed handwheel 26 can generate. The additional leverage provides the same advantages as a large spoked handwheel or a pipe extension, without the safety disadvantages. For example, the compact and ergonomic position of upper arm 32 and lower arm 34 facilitate an operator exerting considerable force without risk of over extension and injury. An operator may use both hands and feet on at least two leverage points. Thus, in addition to upper body muscles, the operator may also use stronger lower body muscles to exert force on the leverage points.

Different than a conventional pipe extension, winch tightening apparatus 30 is compact enough that it may be attached to winch 10 without substantially interfering with the space around the winch. Thus, winch tightening apparatus 30 provides operational advantages over the conventional pipe extension because the operator may eliminate the time and effort needed to attach, remove, and stow the pipe extension.

Figure 2A:
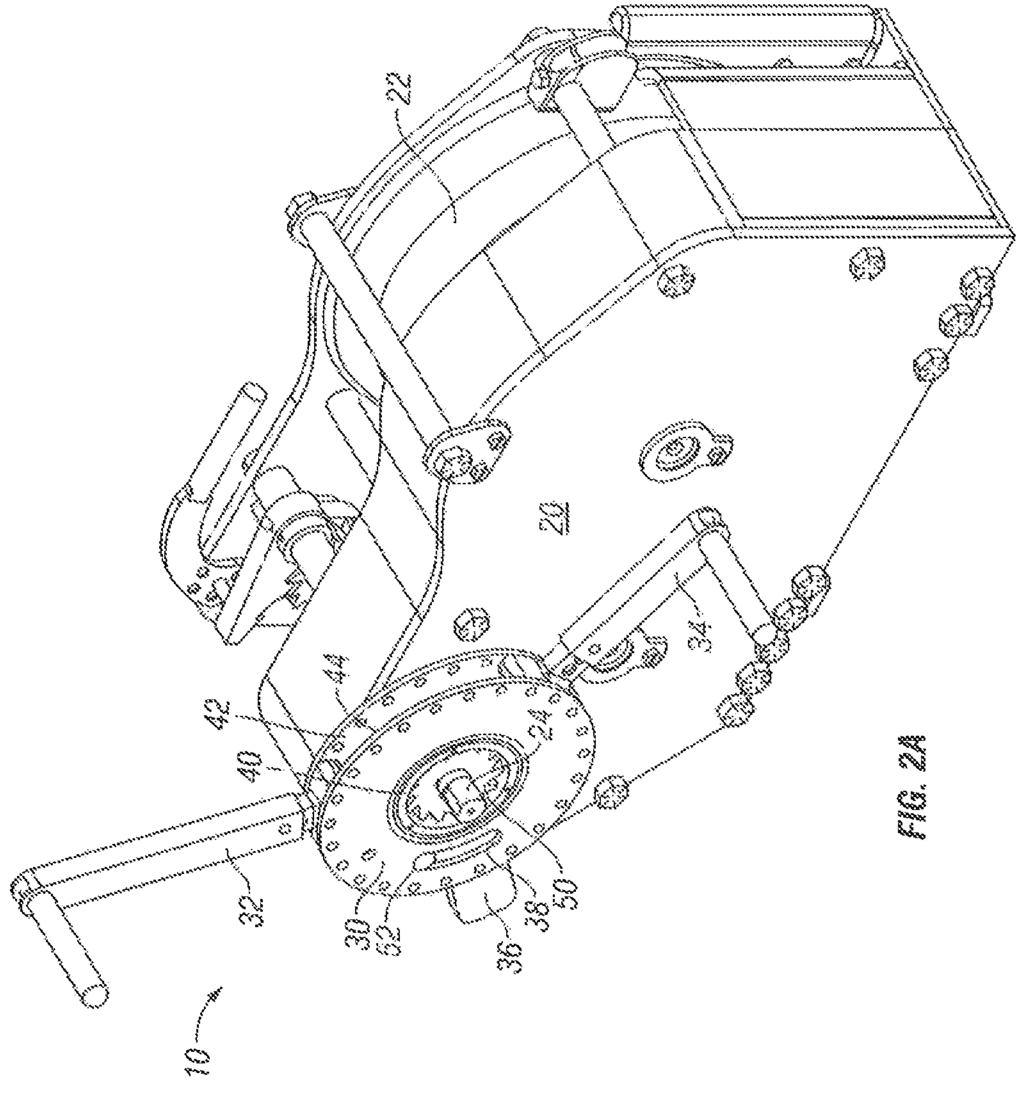
FIG. 2A is a perspective schematic of a winch with an example winch tightening mechanism in a rest position with the closed handwheel removed for ease of illustration, according to some embodiments.

FIG. 2A is a perspective schematic of a winch with an example winch tightening mechanism in a rest position with the closed handwheel removed for ease of illustration, according to some embodiments. Winch 10 includes winch housing 20, winch drum 22, drive shaft 24, and winch tightening apparatus 30 similar to those described above with respect to FIG. 1.

In particular embodiments, winch tightening apparatus 30 includes hub 40, inner mounting plate 42, and outer mounting plate 44. Hub 40 rotationally couples inner mounting plate 42 and outer mounting plate 44 to winch housing 20. Inner mounting plate 42 and outer mounting plate 44 provide coupling points for upper arm 32, lower arm 34, and counterweight 36.

In particular embodiments, ratchet gear 50 is coupled to drive shaft 24. A pawl (e.g., pawl 90 described in more detail below with respect to FIGS. 6, 10A and 10B) pivotally coupled (e.g., pinned) between inner mounting plate 42 and outer mounting plate 44 is operable to engage ratchet gear 50 as winch tightening apparatus 30 is rotated around hub 40. A winch operator may rotate winch tightening apparatus 30 using upper arm 32 and lower arm 34 to engage the pawl with ratchet gear 50 and rotate drive shaft 24.

In particular embodiments, one or both of inner mounting plate 42 and outer mounting plate 44 may include slot 38. Slot 38 may restrict the rotational motion of winch tightening apparatus 30. For example, particular embodiments include stop pin 52 coupled to winch housing 20. Stop pin 52 may extend into slot 38. As winch tightening apparatus 30 rotates with stop pin 52 in slot 38, the length of slot 38 limits the range of motion of winch tightening apparatus 30. Varying the length of slot 38 varies the range of motion of winch tightening apparatus 30. In particular embodiments, the range of motion may be limited to approximately 30 degrees. Other embodiments may limit the range of motion to any suitable range for a particular winch. For example, the range of motion may vary according the size or gearing of a particular winch.

One advantage of the limited range of motion is operator safety. For example, if the winch tightening apparatus 30 is accidentally released under load in an uncontrolled manner, the limited range of motion will prevent upper arm 32 and lower arm 34 from spinning out of control, substantially reducing the chance of them striking the operator. Other advantages of slot 38 are described below.

Rotating winch tightening apparatus 30 to turn drive shaft 24 may be referred to as an indexing operation. The motion of pulling on upper arm 32 and pushing down on lower arm 34 may be referred to as an indexing stroke. For example, in particular embodiments and indexing stroke may index ratchet gear 50 by one gear tooth. Other embodiments may index ratchet gear 50 by any suitable number of gear teeth per indexing operation or indexing stroke.

In particular embodiments, the length of slot 38 may determine the number of teeth of ratchet gear 50 that may be indexed in one indexing stroke. For safety, slot 38 may be sized to limit each indexing stroke to indexing a single tooth of ratchet gear 50.

In particular embodiments, counterweight 36 may be coupled to inner mounting plate 42 and outer mounting plate 44. Counterweight 36 is positioned on inner mounting plate 42 and outer mounting plate 44 so that after each indexing stroke, the weight of counterweight 36 causes winch tightening apparatus 30 to rotate and disengage the pawl from ratchet gear 50.

When the pawl of winch tightening apparatus 30 is disengaged from ratchet gear 50, winch tightening apparatus 30 may be referred to as in the rest position. When the pawl of winch tightening apparatus 30 is engaged with ratchet gear 50, winch tightening apparatus 30 may be referred to as in the indexed position.

Counterweight 36 returns winch tightening apparatus 30 from the indexed position to the rest position when the operator releases upper arm 32 and lower arm 34. FIG. 2A illustrates winch tightening apparatus 30 in a rest position.

In particular embodiments, counterweight 36 may provide a safety advantage. For example, by returning winch tightening apparatus 30 to the rest position after each indexing operation, a winch operator may not accidentally leave the pawl of the winch tightening apparatus 30 engaged with ratchet gear 50. This provides a safety advantage because, if the winch locking gear is accidentally released under load in an uncontrolled manner and the pawl is still engaged with ratchet gear 50, then winch tightening apparatus 30, including upper arm 32 and lower arm 34, may also spin out of control causing serious injury. If the pawl is not engaged with ratchet gear 50, however, then winch tightening apparatus 30 may remain stationary even if winch drum 22 and drive shaft 24 are spinning out of control.

Figure 2B:
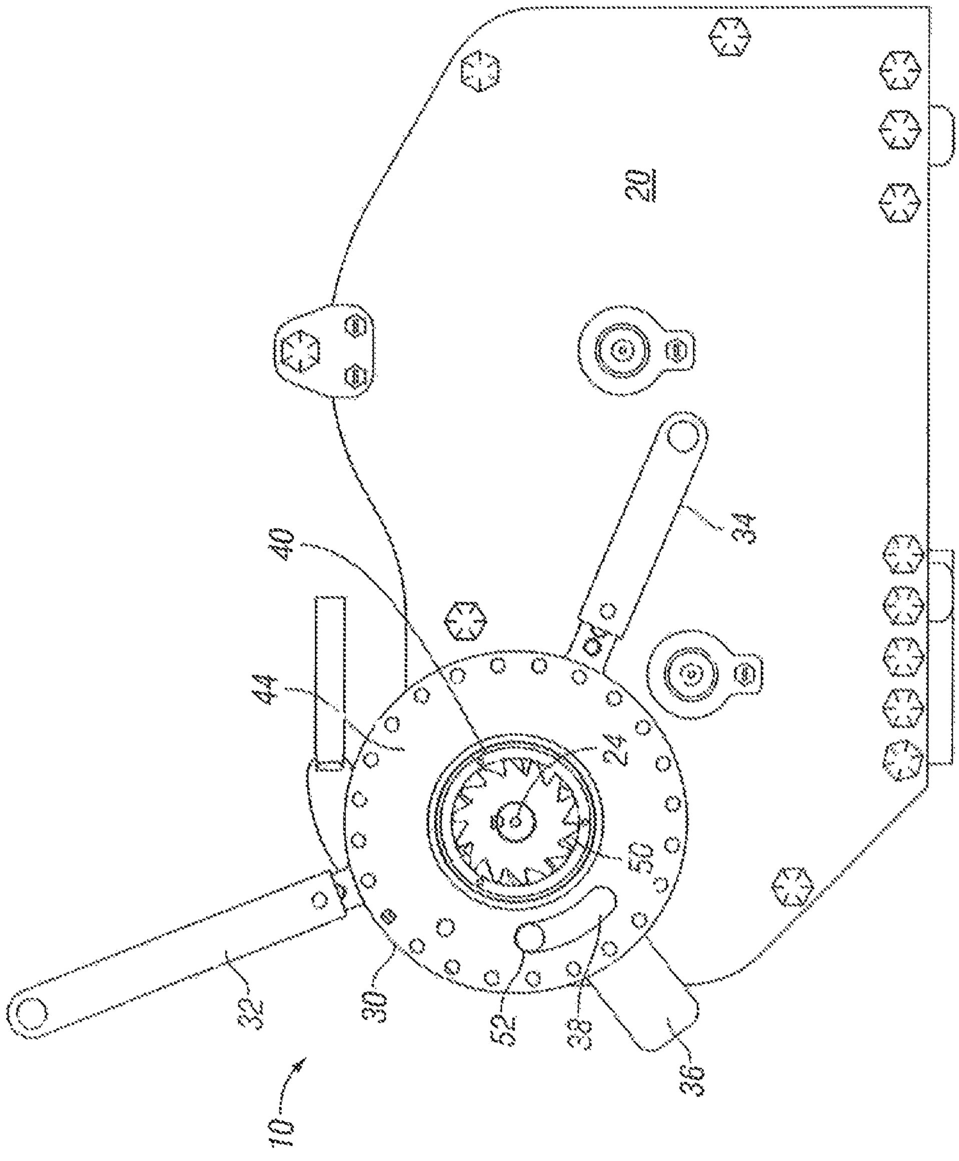
FIG. 2B is a side schematic of a winch with an example winch tightening mechanism in a rest position with the closed handwheel removed for ease of illustration, according to some embodiments.

FIG. 2B is a side schematic of a winch with an example winch tightening mechanism in a rest position with the closed handwheel removed for ease of illustration, according to some embodiments. FIG. 2B illustrates the side view of the elements described with respect to FIG. 2A.

In the illustrated example, winch tightening apparatus 30 is in the rest position. In the rest position, counterweight 36 applies a force to winch tightening apparatus 30 such that the top of slot 38 is resting against stop pin 52.

In particular embodiments, both inner mounting plate 42 and outer mounting plate 44 may include slot 38. In other embodiments, only inner mounting plate 42 includes slot 38. In particular embodiments, a mechanical stop may be fixed to inner mounting plate 42 and the range of motion of winch tightening apparatus 30 may be limited by a slot or protrusions on winch housing 20. Other embodiments may include any suitable mechanism to limit the rotation of winch tightening apparatus 30.

Although the illustrated embodiments depict counterweight 36 as a gravity operated by a weighted arm, in other embodiments counterweight 36 may include a spring, or a combination of springs and/or weights. In some embodiments, counterweight 36 may comprise any suitable mechanism for returning winch tightening apparatus 30 to a rest position.

Figure 3A:
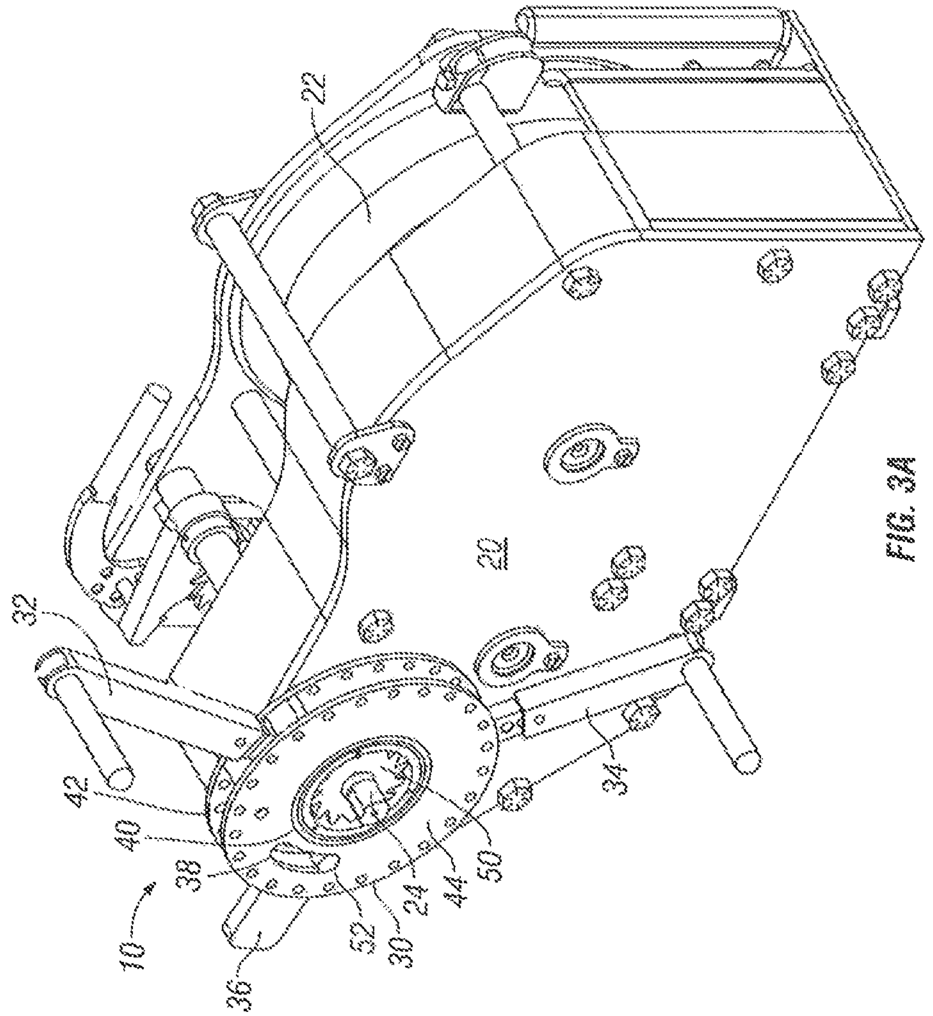
FIG. 3A is a perspective schematic of a winch with an example winch tightening mechanism in an indexed position with the closed handwheel removed for case of illustration, according to some embodiments.

FIG. 3A is a perspective schematic of a winch with an example winch tightening mechanism in an indexed position with the closed handwheel removed for ease of illustration, according to some embodiments. FIG. 3A illustrates elements similar to those described with respect to FIG. 2A.

In the illustrated example, winch tightening apparatus 30 is in the indexed position. In the indexed position, an operator has applied a force to winch tightening apparatus 30 such that the bottom of slot 38 is resting against stop pin 52. In particular embodiments, the combination of slot 38 and stop pin 52 may limit the indexing operation to indexing any suitable number of teeth of ratchet gear 50. For safety, the indexing operation may be limited to particular number to restrict a winch operator from attempting to tension the winch line too much at one time. This limits the ability of the energy stored in the winch line to return to the winch operator.

Figure 3B:
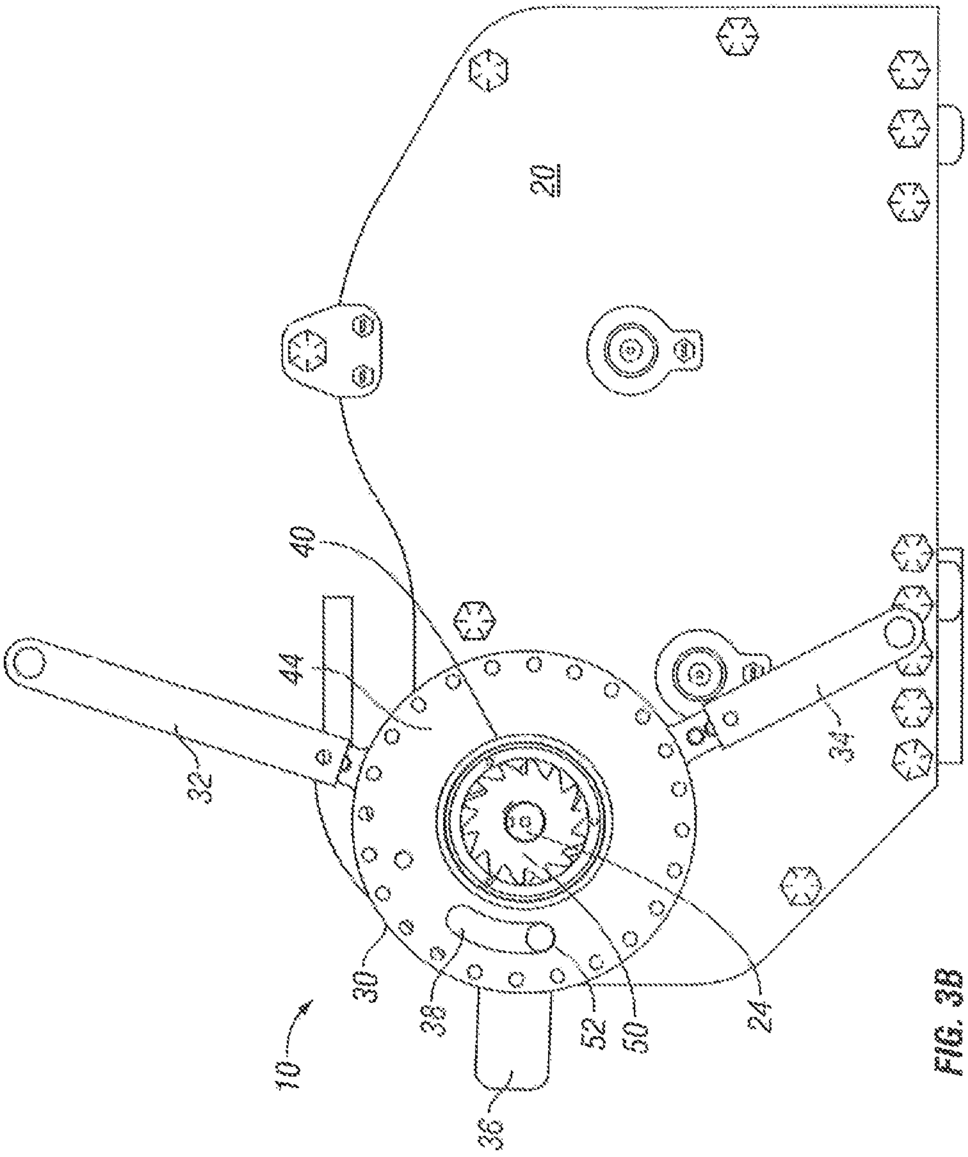
FIG. 3B is a side schematic of a winch with an example winch tightening mechanism in an indexed position with the closed handwheel removed for ease of illustration, according to some embodiments.
Figure 10B:
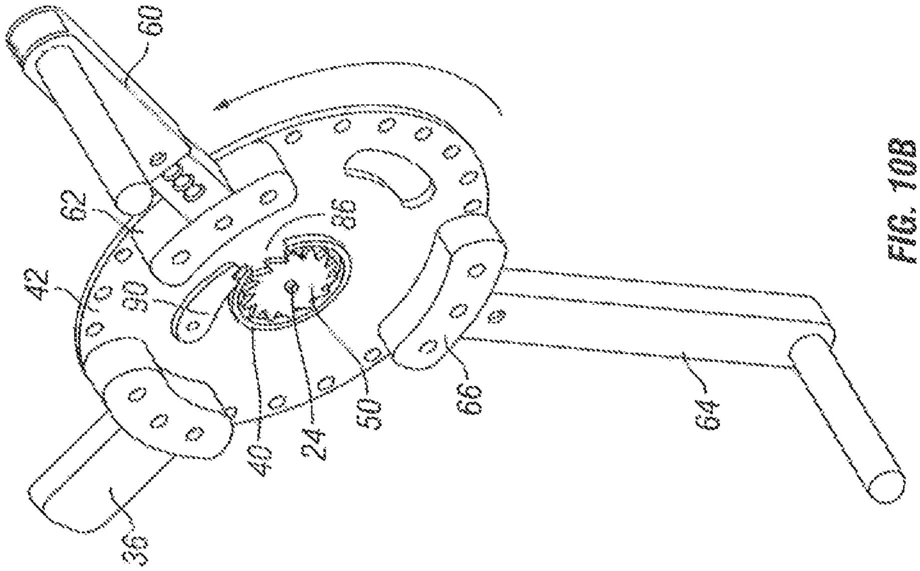
FIG. 10B is a sectional schematic of an example winch tightening mechanism illustrating a pawl in a rest position, according to a particular embodiment.
Figure 10A:
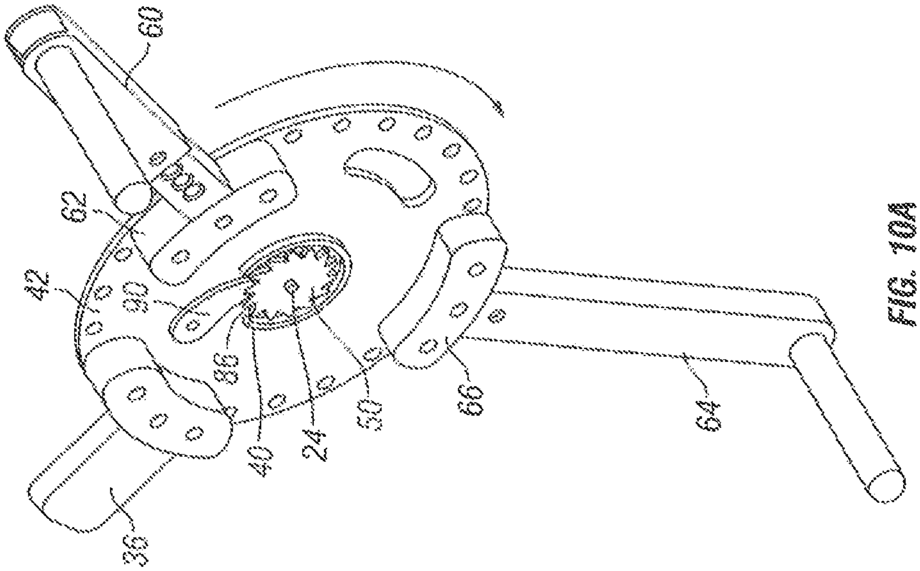
FIG. 10A is a sectional schematic of an example winch tightening mechanism illustrating a pawl in an indexed position, according to a particular embodiment.

FIG. 3B is a side schematic of a winch with an example winch tightening mechanism in an indexed position with the closed handwheel removed for ease of illustration, according to some embodiments. FIG. 3B illustrates the side view of the elements described with respect to FIG. 3A. FIGS. 10A and 10B described below illustrate winch tightening apparatus 30 in the indexed and rest positions, respectively, with outside mounting plate 46 removed to provide a more detailed description of the indexed and rest positions.

Although the illustrated embodiments depict ratchet gear 50 coupled directly to drive shaft 24, in other embodiments ratchet gear 50 may be coupled to drive shaft 24 via any number of secondary gears. For example, any suitable configuration of reduction or other gears may couple ratchet gear 50 to drive shaft 24. In addition to changing gear ratios, particular embodiments may include secondary gears to more ergonomically position winch tightening apparatus 30.

For example, in particular embodiments, winch 10 may be larger or smaller than those illustrated herein. For certain large or small winches, coupling ratchet gear 50 (and hub 40, etc.) near drive shaft 24 may position winch tightening apparatus 30 too high or low for comfortable operation. Some embodiments may include secondary gears (or any other suitable mechanism) to couple winch tightening apparatus 30 to winch housing 20 at a location suitable for safe and efficient operation.

Although the illustrated embodiments depict winch tightening apparatus 30 positioned between the closed handwheel and the winch housing, other embodiments may position winch tightening apparatus 30 at any suitable location. For example, particular embodiments may position winch tightening apparatus 30 on a different side of the winch than the closed handwheel, or on the same side of the winch, but offset from the closed handwheel.

Figure 4:
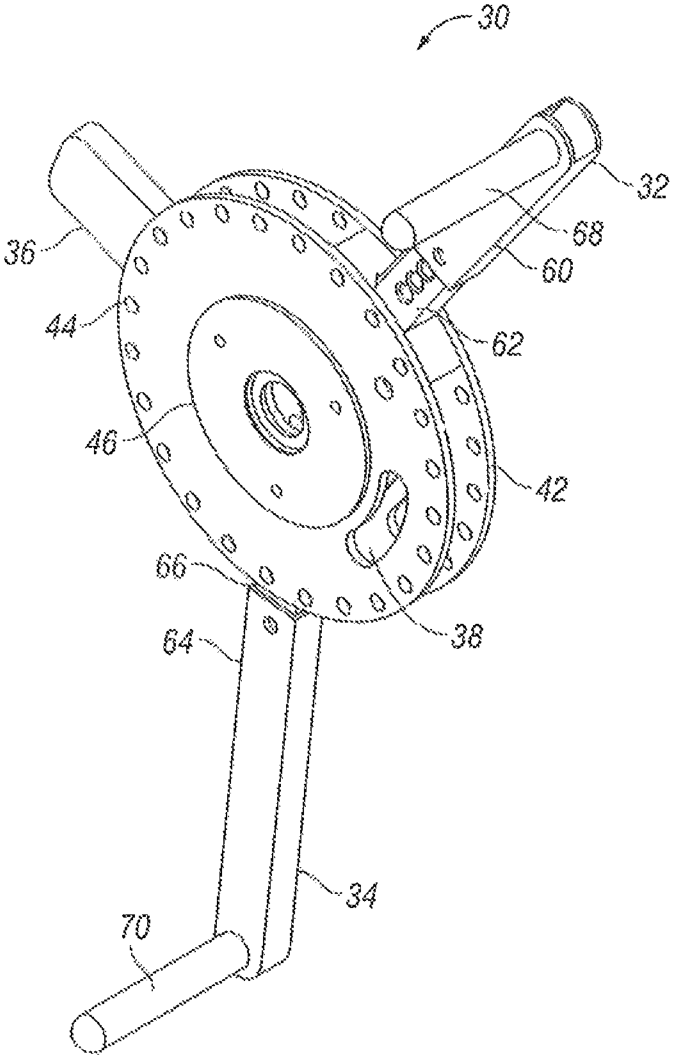
FIG. 4 is a perspective schematic of an example winch tightening mechanism, according to particular embodiments.

FIG. 4 is a perspective schematic of an example winch tightening mechanism, according to particular embodiments. In particular embodiments, winch tightening apparatus 30 includes upper arm 32, lower arm 34, counterweight 36, slot 38, inner mounting plate 42, and outer mounting plate 44 similar to those described above with respect to FIGS. 1-3. In particular embodiments, winch tightening apparatus 30 includes cover plate 46. Cover plate 46 covers hub 40. In particular embodiments, cover plate 46 may couple inner mounting plate 42 and outer mounting plate 44 to hub 40.

In particular embodiments, upper arm 32 and lower arm 34 are positioned approximately 120 to 150 degrees apart. Other embodiments may position upper arm 32 and lower arm 34 relative to each other in a position suitable for a particular winch or particular operator. For example, as illustrated inner mounting plate 42 and outer mounting plate 44 include a series of mounting holes along their perimeter. In particular embodiments, upper arm 32, lower arm 34, and counterweight 36 may be coupled (e.g., bolted, welded, or any other suitable fastening mechanism) at any suitable location around the perimeter of inner mounting plate 42 and outer mounting plate 44.

In particular embodiments, upper arm 32 includes hollow portion 60, solid portion 62, and handle 68. Solid portion 62 couples to inner mounting plate 42 and outer mounting plate 44. Hollow portion 60 may be coupled to solid portion 62 and handle 68 may be coupled to hollow portion 60. Handle 68 may assist a winch operator to apply rotational pressure to upper arm 32.

In particular embodiments, hollow portion 60 and/or handle 68 may be detachable and field replaceable. For example, in particular embodiments solid portion 62 may include a series of coupling points for hollow portion 60. An overall length of upper arm 32 may be adjusted by coupling hollow portion 60 to a different coupling point of solid portion 62. In particular embodiments, the length of upper arm 32 may be adjusted for the comfort of a particular operator, may be adjusted to vary the mechanical advantage of upper arm 32, or adjusted for any other suitable purpose.

In some embodiments, multiple hollow portions 60 may be easily substituted for each other by simply coupling a different hollow portion 60 to solid portion 62. This may facilitate easy replacement of parts, or easy substitution of customized parts (e.g. different style handles, different length parts, etc.).

Although handle 68 is illustrated as a bar, handle 68 may comprise a bar, platform, stirrup, or any other suitable shape for an operator to apply force to upper arm 32. An enclosed handle may provide particular advantages. For example, handle 68 may comprise an enclosed D-shape. A particular advantage of a D-shaped handle (or any other enclosed shape) is that the closed nature of the D-shape reduces the risk that the handle may snag an operator's clothing or equipment. As a particular example, an operator wearing a life jacket may catch the straps of the life jacket on a bar-shaped handle. The closed nature of a D-shaped handle, however, is less likely to catch the straps of the lifejacket, or other clothing or equipment. Handle 68 may include a non-slip texture, rubberized grips, or any other suitable coating material.

In particular embodiments, lower arm 34 includes hollow portion 64, solid portion 66, and handle 70. Similar to upper arm 32 described above, solid portion 66 couples to inner mounting plate 42 and outer mounting plate 44. Hollow portion 64 may be coupled to solid portion 66 and handle 70 may be coupled to hollow portion 64. Hollow portion 64 and/or handle 70 may be detachable or field replaceable. In particular embodiments, solid portion 66 may include a series of coupling points for hollow portion 64. An overall length of lower arm 34 may be adjusted by coupling hollow portion 64 to a different coupling point of solid portion 66. Handle 70 may include any suitable configuration as described with respect to handle 68.

In particular embodiments, one or both of hollow portions 60 and 64 may be configured to shear away from solid portions 62 and 66, respectively. For example, during barge operation one barge or tug may accidentally overtop another barge (i.e., an edge of one barge may come up and over the edge of another barge). Winches are typically located at the corners of the barge deck where they are likely to suffer collision damage if a barge is overtopped. While winch housing 20 may be generally compact and structurally strong enough to protect the components inside winch housing 20 if the barge is overtopped, upper arm 32 and/or lower arm 34 may extend outward from winch housing 20 and may be susceptible to damage if the barge is overtopped. Furthermore, excessive force applied to upper arm 32 and/or lower arm 34 may damage other components of winch 10. Enabling upper arm 32 and/or lower arm 34 to shear away may prevent damage to other components of winch 10 if the barge is overtopped.

In particular embodiments, one or both of hollow portions 60 and 64 may comprise a shear point. For example, one or both of hollow portions 60 and 64 may be coupled to solid portions 62 and 66, respectively, with a shareable coupling. In particular embodiments, the shareable coupling may include a shear pin coupling, for example, hollow portion 60 to solid portion 62. In some embodiments, hollow portion 60 may comprise a shear point at a particular location along its length, or may comprise a softer material than solid portion 62, such that hollow portion 60 will break or shear away from solid portion 62 when a particular force is applied to hollow portion 60.

Figure 5B:
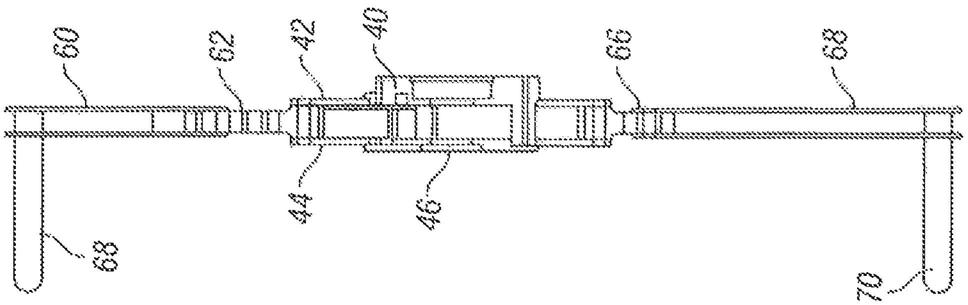
FIG. 5B is a sectional schematic of an example winch tightening mechanism, according to particular embodiments.
Figure 5A:
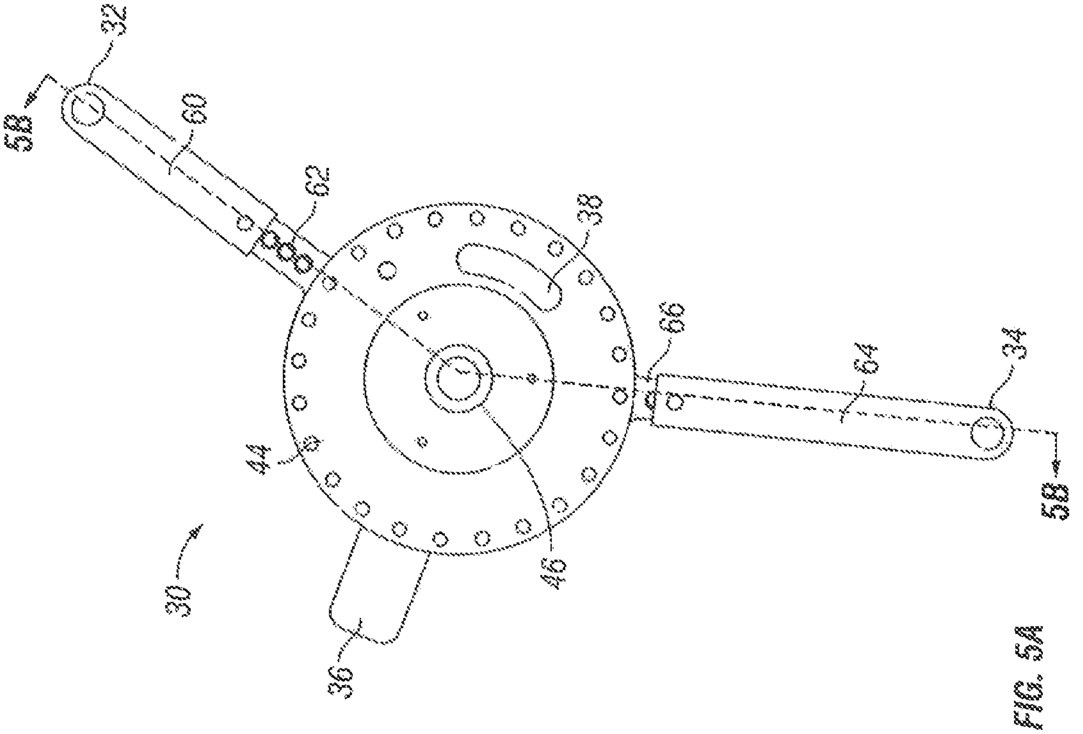
FIG. 5A is a side schematic of an example winch tightening mechanism, according to particular embodiments.

FIG. 5A is a side schematic of an example winch tightening mechanism, according to particular embodiments, FIG. 5A is a side schematic of winch tightening apparatus 30 illustrated in FIG. 4.

FIG. 5B is a sectional schematic of an example winch tightening mechanism, according to particular embodiments. FIG. 5B is a sectional schematic taken along the dashed line labeled A of FIG. 5A.

In particular embodiments, inner mounting plate 42 and outer mounting plate 44 include a plurality of bolt holes around their perimeter. Using these bolt holes, upper arm 32, lower arm 34, and/or counterweight 36 may be positioned at any suitable position around inner mounting plate 42 and outer mounting plate 44. In particular embodiments, the position of upper arm 32, lower arm 34, and/or counterweight 36 around inner mounting plate 42 and outer mounting plate 44 may be adjusted in the field (e.g., to adapt to a particular operator, to a particular winch location, to a particular lading, etc.).

Particular embodiments may not include lower arm 34, or lower arm 34 may be added/removed in the field as desired by a particular operator. Even without lower arm 34 to provide additional leverage, particular embodiments benefit from the other safety and ergonomic benefits described herein with respect to winch tightening apparatus 30.

Particular embodiments are illustrated with open space between inner mounting plate 42 and outer mounting plate 44 and between upper arm 32, lower arm 34, and/or counterweight 36 (i.e., the area between inner mounting plate 42 and outer mounting plate 44 that is not occupied by upper arm 32, lower arm 34, and/or counterweight 36 is left open). In other embodiments, the open space may be filled (at least partially) with a dustcover (e.g., plastic, metal, or any other suitable material) to prevent dirt, water, ice, snow, or other contaminants from fouling hub 40 or other components of winch 10. For example, the bolt holes around the perimeter of inner mounting plate 42 and outer mounting plate 44 not used to secure upper arm 32, lower arm 34, and/or counterweight 36 may be used to secure a strip of plastic, metal, etc. in the openings between upper arm 32, lower arm 34, and/or counterweight 36.

In particular embodiments, the various components illustrated as coupled together may actually comprise a single component. For example, in some embodiments any one or more of inner mounting plate 42, outer mounting plate 44, solid portions 62, solid portion 66, hollow portion 60, hollow portion 64, handle 68, handle 70, upper arm 32, lower arm 34, or counterweight 36, etc. may be formed as a single component or group of components.

Figure 6:
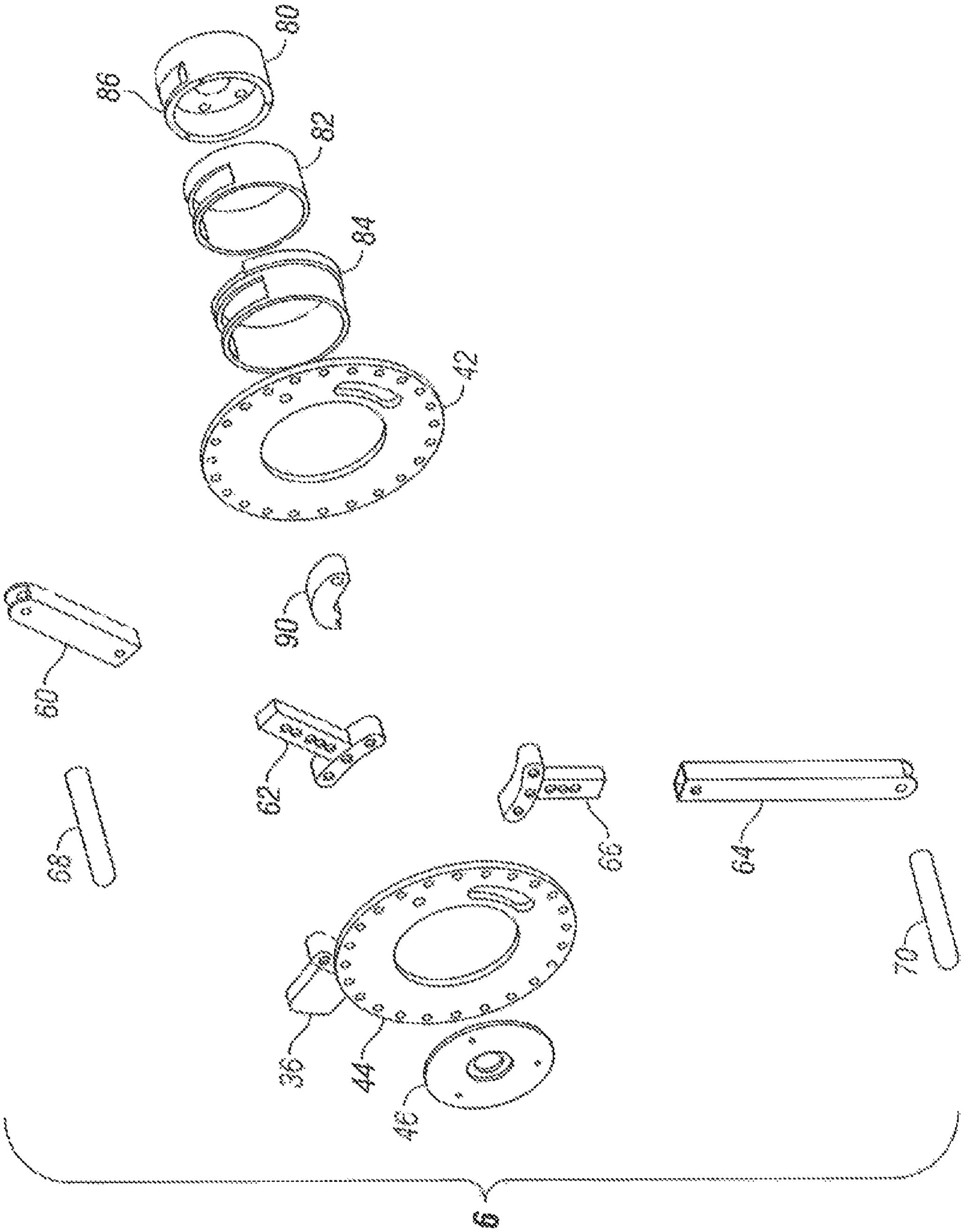
FIG. 6 is an exploded schematic of an example winch tightening mechanism, according to particular embodiments.

FIG. 6 is an exploded schematic of an example winch tightening mechanism, according to particular embodiments. Like numbered components are similar to those described above with respect to FIGS. 1-5B.

In the illustrated exploded view, pawl 90 is visible. Pawl 90 may also be referred to as a dog. In particular embodiments, a first end of pawl 90 is pivotally coupled to inner mounting plate 42 and/or outer mounting plate 44. In some embodiments, the first end of pawl 90 may be pinned between inner mounting plate 42 and/or outer mounting plate 44.

In particular embodiments, hub 40 includes central hub 80, hub bushing 82, and outer hub 84 fitted over hub bushing 82. Hub 40 also includes slot 86. In particular embodiments, hub bushing 82 may comprise a bronze (or any other suitable material) bushing forced onto central hub 80. Hub bushing 82 may provide sliding contact with outer hub 84. In particular embodiments, the sliding contact may be assisted by oil, grease, or any other suitable lubricant. Inner mounting plate 42 and outer mounting plate 44 may be coupled to outer hub 84 via welding or any other suitable coupling method.

Pawl 90 is movably or pivotally hinged (e.g., pinned) at a first end such that a second end of pawl 90 may pass through slot 86 of hub 40 to engage with ratchet gear 50. For example, during an indexing operation, pawl 90 engages with ratchet gear 50 as winch tightening apparatus 30 is rotated in a first direction around hub 40. After the indexing operation, counterweight 36 may rotate winch tightening apparatus 30 in an opposite direction which may lift pawl 90 out of slot 86 and disengage pawl 90 from ratchet gear 50. In particular embodiments, slot 38 may be shaped such that rotation of winch tightening apparatus 30 in the direction opposite the tensioning direction automatically forces pawl 90 out of engagement with ratchet gear 50. When pawl 90 is disengaged from ratchet gear 50, winch tightening apparatus 30 is in a rest position. FIGS. 10A and 10B provide a more detailed illustration of the interaction between pawl 90, slot 86 of hub 40, and ratchet gear 50.

Figure 7:
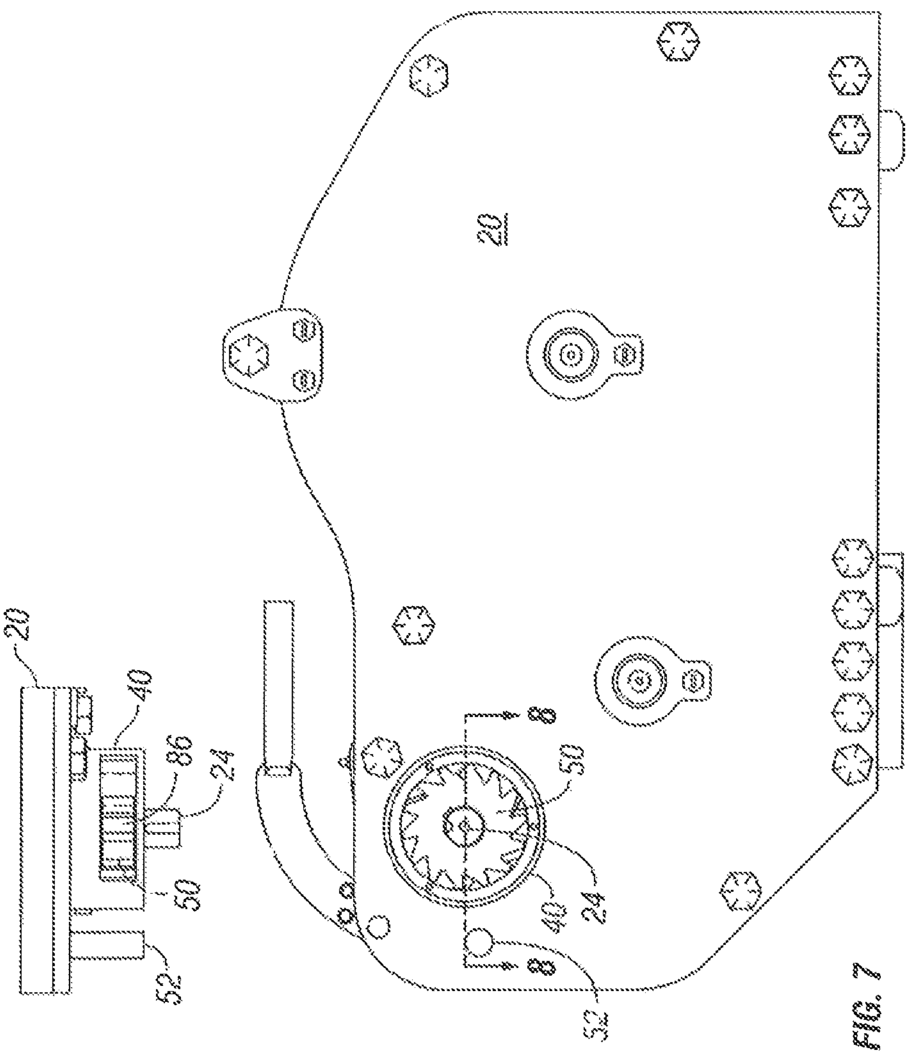
FIG. 7 is a side and section schematic of a ratchet of an example winch tightening mechanism, according to particular embodiments.

FIG. 7 is a side and section schematic of a ratchet of an example winch tightening mechanism, according to particular embodiments. FIG. 7 includes aside view of winch 10 illustrated in FIGS. 1-3B with winch tightening apparatus 30 removed for ease of illustration. FIG. 7 also includes a sectional view of hub 40, ratchet gear 50, and stop pin 52 taken along the line labeled A.

In the side view, ratchet gear 50 is coupled to drive shaft 24. Hub 40 surrounds drive shaft 24 and ratchet gear 50. Hub 40 couples winch tightening apparatus 30 to winch housing 20.

As illustrated in the sectional view, hub 40 includes slot 86. Slot 86 provides access for pawl 90 to engage with ratchet gear 50. When pawl 90 is not engaged with ratchet gear 50, winch tightening apparatus 30 is free to rotate around hub 40 independent of drive shaft 24. When pawl 90 is engaged with ratchet gear 50, rotation of winch tightening apparatus 30 rotates drive shaft 24.

Figure 8:
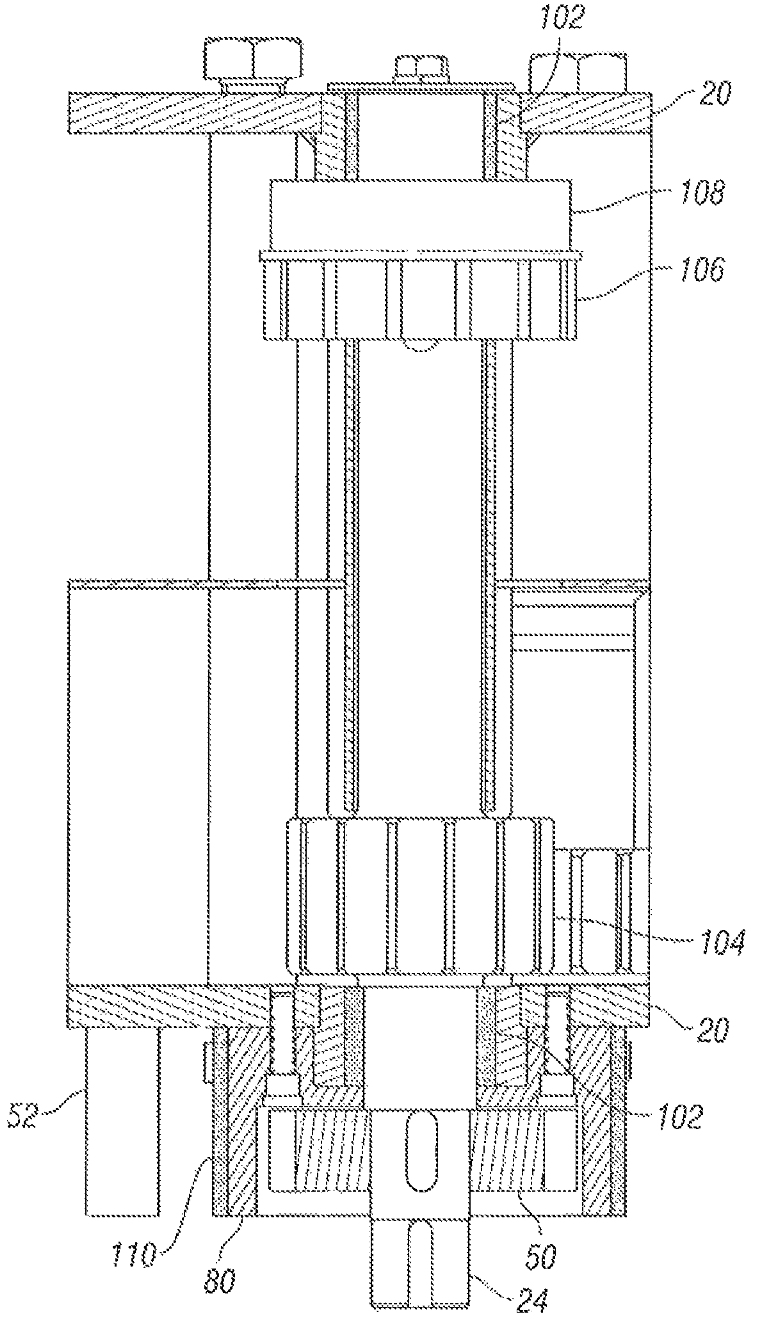
FIG. 8 is a sectional schematic of a winch drive shaft and a ratchet of an example winch tightening mechanism, according to particular embodiments.

FIG. 8 is a sectional schematic of a winch drive shaft and a ratchet of an example winch tightening mechanism, according to particular embodiments. Like numbered components are similar to those described above with respect to FIGS. 1-6.

As described above, ratchet gear 50 is coupled to drive shaft 24. Inner hub 80 is coupled to winch housing 20. Stop pin 52 is also coupled to winch housing 20 and limits the travel of winch tightening apparatus 30. Ratchet gear 50 and inner hub 80 comprise part of the secondary tensioning system.

Also illustrated are drive shaft bushings 102, driving gear 104, locking gear 106, brake drum 108, and hub bushing/bearing 110. These components comprise part of the primary tensioning system. For example, driving gear 104 comprises the primary tensioning gear and may be controlled by closed handwheel 26. When pawl 90 is not engaged with ratchet gear 50, ratchet gear 50 rotates freely with drive shaft 24 under the primary tensioning operation. When a winch operator performs an indexing operation causing pawl 90 to engage with ratchet gear 50, then the secondary tensioning system operates in conjunction with components of the primary tensioning system (e.g., driving gear 104, locking gear 106, etc.) to increase the tension of the winch line.

Figure 9:
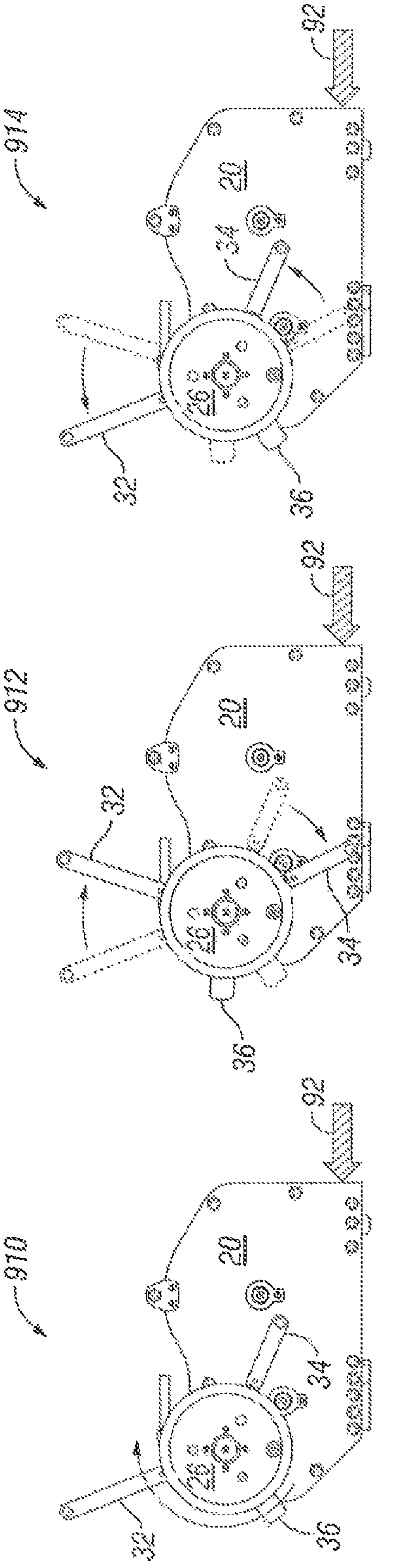
FIG. 9 illustrates a sequence of steps for tightening a winch line, according to some embodiments.

FIG. 9 illustrates a sequence of steps for tightening a winch line, according to some embodiments. In particular embodiments, one or more steps may be performed using the winch components described with respect to FIGS. 1-8. FIG. 9 illustrates three steps included for tightening winch line 92 onto a winch, such as winch 10 described above.

At step 910, the winch operator rotates closed handwheel 26 in the direction of the arrow to take up the slack in winch line 92. The winch tightening apparatus is in the rest position during this step, thus the winch tightening apparatus does not rotate (i.e., upper arm 32 and lower arm 34 are stationary). The winch operator rotates handwheel 26 until winch line 92 is as tight as the operator is able to make it using handwheel 26.

At step 912, the winch operator pulls upper arm 32 with one or both hands and pushes down on lower arm 34 with a foot (see illustrated arrows) to index the winch tightening apparatus and apply additional tension to winch line 92. As described above, the range of the indexing motion may be limited to a particular number of teeth of ratchet gear 50 or locking gear 106. The range may be limited by the length of slot 86 in hub 40 and/or the length of slot 38 in outer mounting plate 44 and/or inner mounting plate 42.

At step 914, the winch operator releases pressure on upper arm 32 and lower arm 34. Counterweight 36 automatically rotates the winch tightening apparatus in the opposite direction (see arrow illustrating rotational direction) which disengages the winch tightening apparatus from the winch drive shaft. Winch tightening apparatus returns to the rest position. Steps 912 and 914 may be repeated any number of times until the winch operator creates the desired amount of tension in winch line 92.

FIGS. 10A and 10B illustrate the interaction between pawl 90, slot 86 of hub 40, and ratchet gear 50 in the rest and indexed positions, respectively, with outer mounting plate 44 removed for ease of illustration.

FIG. 10A is a sectional schematic of an example winch tightening mechanism illustrating a pawl in an indexed position, according to a particular embodiment. Hub 40 includes slot 86 in a portion of its circumference.

As winch tightening apparatus 30 rotates around hub 40 (see arrow illustrating rotational direction), the circumference of hub 40 prevents pawl 90 from contacting ratchet gear 50 until pawl 90 is rotated past slot 86 at which point pawl 90 may drop through slot 86 to engage ratchet gear 50, as illustrated. Winch tightening apparatus 30 may continue rotating, with ratchet gear 50 engaged and thus applying tension to the winch line, until pawl 90 contacts the end of slot 86. At that point the indexing operation is complete. Counterweight 36 may return winch tightening apparatus 30 back to the rest position, disengaging pawl 90 from ratchet gear 50 as illustrated in FIG. 10B.

In particular embodiments, gravity facilitates pawl 90 engaging ratchet gear 50 as winch tightening apparatus 30 rotates pawl 90 into slot 86. In some embodiments, the engagement and/or disengagement of pawl 90 may be assisted by springs, or any other suitable assistance mechanism.

FIG. 10B is a sectional schematic of an example winch tightening mechanism illustrating a pawl in a rest position, according to a particular embodiment. When winch tightening apparatus 30 is rotated in the opposite direction from the indexing operation (see arrow illustrating rotational direction), pawl 90 comes into contact with an end of slot 86 which causes pawl 90 to lift out of slot 86, disengaging pawl 90 from ratchet gear 50.

A particular advantage provided by slot 86 is that the particular length of slot 86 limits excessive rotational motion associated with an indexing stroke (e.g., preventing the winch operator from tensioning the winch in a position that is harmful). For example, in addition to slot 38 and stop pin 52 described above, slot 86 may also control the number of teeth of ratchet gear 50 or locking gear 106 that each indexing operation may index (e.g., one tooth per stroke). Limiting the number of gear teeth indexed per indexing stroke also limits the range of motion associated with each indexing stroke. Limiting the range of motion may prevent the winch operator from overextending.

Limiting the number of gear teeth indexed per indexing operation may provide another safety advantage by preventing a winch operator from attempting to tighten the winch by too many gear teeth at one time. For example, limiting an indexing operation to a single gear tooth minimizes the amount of line tension an operator is pulling against with each indexing stroke. In particular embodiments, the length and shape of slot 86 may enable indexing of 1, 2, 3, or any suitable number of teeth of ratchet gear 50 or locking gear 106.

A particular advantage of automatically disengaging pawl 90 from ratchet gear 50 after each indexing operation is that it may limit the ability of the energy stored in the winch line to return to the winch operator. For example, if pawl 90 is disengaged from ratchet gear 50, then sudden or uncontrolled movement of winch drum 22 and drive shaft 24 will not be transferred to winch tightening apparatus 30.

Another advantage of particular embodiments is that hub 40 reduces the effort a winch operator exerts to unspool winch line from winch 10. For example, conventional winches may include a ratchet gear coupled to the winch driveshaft with a ratchet handle to engage the ratchet gear. When a winch operator unspools winch line from a conventional winch, the winch operator exerts effort to overcome the drag of the ratchet handle putting pressure on the ratchet gear. A particular advantage of some embodiments is that hub 40 and slot 86 prevent pawl 90 from putting pressure on ratchet gear 50 when a winch operator unspools winch line from winch 10. Accordingly, the winch operator may exert less effort to unspool the winch line, which may amount to a considerable amount of savings when multiplied by the number of times a winch operator may unspool winch line in any given day/trip.

Figure 11:
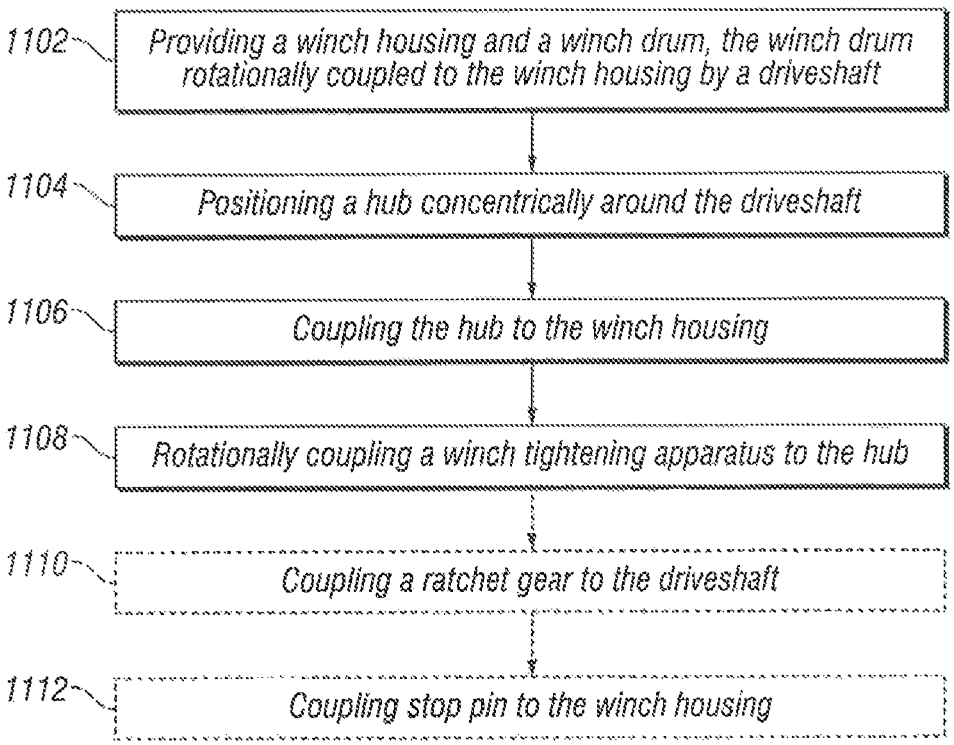
FIG. 11 is a flow diagram illustrating an example method of coupling a winch tightening mechanism to a winch, according to some embodiments.

Many existing winches may be retrofitted to include the advantages of the winch tightening embodiments described herein. For example, a winch's existing tightening mechanism (handwheel, ratchet, etc.) may be removed and replaced with one of the embodiments described herein. FIG. 11 illustrates a method of attaching (either new or retrofit) a winch tightening mechanism to a winch.

FIG. 11 is a flow diagram illustrating an example method of coupling a winch tightening mechanism to a winch, according to some embodiments. In particular embodiments, one or more steps of method 1100 may be performed to manufacture a winch, such as the winch described with respect to FIGS. 1-10.

The method begins at step 1102, where a winch housing and winch drum are provided. The winch drum, such as winch drum 22, is rotationally coupled to the housing, such as winch housing 20, by a drive shaft, such as drive shaft 24. In particular embodiments, the winch housing may comprise a new winch housing or a winch housing of an existing winch (i.e., retrofit).

At step 1104, a hub is positioned concentrically around the driveshaft. For example hub 40 may be positioned around driveshaft 24 as illustrated in any of FIGS. 2A-10B.

At step 1106, the hub is coupled to the winch housing. For example, hub 40 may be coupled to winch housing 20. In particular embodiments, hub 40 may be welded to winch housing 20.

At step 1108, a winch tightening apparatus is rotationally coupled to the hub. For example, winch tightening apparatus 30 may be coupled to hub 40 as in any of the embodiments described above.

At optional step 1110, a ratchet gear is coupled to the drive shaft. For example, when manufacturing a new winch, a ratchet gear is coupled to the drive shaft. Additionally, in some retrofit applications the drive shaft may not include a ratchet gear, and so a ratchet gear is coupled to the drive shaft. In other retrofit applications, however, the winch may include a ratchet handle and ratchet gear, in which case the ratchet handle may be removed but the ratchet gear may be reused.

At optional step 1112, a stop pin is coupled to the winch housing. For example, stop pin 52 may be coupled to winch housing 20. In particular embodiments, stop pin 52 may extend into a slot in winch tightening apparatus 30, such as slot 38, to limit the rotational motion of winch tightening apparatus 30.

Modifications, additions, or omissions may be made to the method of FIG. 11. Additionally, one or more steps in method 1100 of FIG. 11 may be performed in parallel or in any suitable order.

Some embodiments of the disclosure may provide one or more technical advantages. As an example, some embodiments improve the speed by which a winch operator may tension the winch because the winch operator no longer needs to locate and install a pipe extension. Also, the range of motion an operator uses to generate line tension is significantly reduced. A winch operator may use both his arms and legs on two moment arms, generating a couple, which enables the operator to generate more tension than with a simple lever arm. Accordingly, the winch operator can generate greater line tension with the winch.

Particular embodiments provide safety advantages. For example, embodiments described herein may be used by the operator in an ergonomic and adjustable manner, which may reduce a risk of overstressing muscles from working in an awkward position. Particular embodiments reduce the ability of the winch manual controls to return the energy of the winch line tension back to the operator. Accordingly, the time and effort to secure the connection of barges is reduced, while safety is increased. Particular embodiments include moment arms with shear points to reduce damage to the winch if a barge is overtopped. Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components.

Modifications, additions, or omissions may be made to the methods disclosed herein without departing from the scope of the invention. The methods may include more, fewer, or other steps. Additionally, steps may be performed in any suitable order.

Although embodiments of the present disclosure and their advantages have been described in detail, it should be understood that various changes, substitutions and alternations can be made herein without departing from the spirit and scope of the invention as defined by the claims below.

The invention claimed is:

1. A winch apparatus, comprising:
- a winch housing;
- a winch drum rotationally coupled to the winch housing by a drive shaft;
- a ratchet gear coupled to the drive shaft for rotating the winch drum;
- a first moment arm coupled to the drive shaft and configured to provide leverage for rotating the drive shaft;
- a pawl coupled to the drive shaft, wherein the pawl engages the ratchet gear via the first moment arm being rotated in a first direction and disengages the ratchet gear via the first moment arm being rotated in a second direction opposite the first direction; and
- a counterweight coupled to the drive shaft, the counterweight positioned to rotate the first moment arm in the second direction to disengage the pawl from the ratchet gear and return the first moment arm to a rest position.

2. The winch apparatus of claim 1, wherein the counterweight is gravity operated or spring operated.

3. The winch apparatus of claim 1, further comprising a second moment arm coupled to the drive shaft offset from the first moment arm and configured to provide leverage for rotating the drive shaft.

4. The winch apparatus of claim 1, further comprising a stop pin coupled to the winch housing positioned to limit the rotational motion of the first moment arm.

5. The winch apparatus of claim 1, wherein the first moment arm is detachable from the drive shaft.

6. The winch apparatus of claim 1, wherein the first moment arm comprises a shear point.

7. A winch tightening apparatus, comprising:
- a first moment arm coupled to a winch drum and configured to provide leverage for rotating the winch drum via a ratchet gear coupled to the winch drum;
- a pawl coupled to the drive shaft, wherein the pawl engages the ratchet gear via the first moment arm being rotated in a first direction and disengages the ratchet gear via the first moment arm being rotated in a second direction opposite the first direction; and
- a counterweight coupled to the drive shaft, the counterweight positioned to rotate the first moment arm in the second direction to disengage the pawl from the ratchet gear and return the first moment arm to a rest position.

8. The winch tightening apparatus of claim 7, wherein the counterweight is gravity operated or spring operated.

9. The winch tightening apparatus of claim 7, further comprising a second moment arm coupled to the winch drum offset from the first moment arm and configured to provide leverage for rotating the winch drum.

10. The winch tightening apparatus of claim 7, wherein the first moment arm is detachable from the winch drum.

11. The winch tightening apparatus of claim 7, wherein the first moment arm comprises a shear point.

12. A method comprising:
- providing a winch housing and a winch drum, the winch drum rotationally coupled to the winch housing by a drive shaft and a ratchet gear;
- rotationally coupling a winch tightening apparatus to the drive shaft, the winch tightening apparatus comprising:
  - a first moment arm coupled to the drive shaft and configured to provide leverage for rotating the drive shaft;
- a pawl coupled to the drive shaft, wherein the pawl engages the ratchet gear via the first moment arm being rotated in a first direction and disengages the ratchet gear via the first moment arm being rotated in a second direction opposite the first direction; and
- a counterweight coupled to the drive shaft, the counterweight positioned to rotate the first moment arm in the second direction to disengage the pawl from the ratchet gear and return the first moment arm to a rest position.

13. The method of claim 12, further comprising coupling a stop pin to the winch housing positioned to limit the rotational motion of the first moment arm.

14. The method of claim 12, wherein the counterweight is gravity operated or spring operated.

15. The method of claim 12, wherein the winch tightening apparatus further comprises a second moment arm coupled to the drive shaft offset from the first moment arm and configured to provide leverage for rotating the drive shaft.

16. The method of claim 12, wherein the first moment arm is detachable from the drive shaft.

17. The method of claim 12, wherein the first moment arm comprises a shear point.

* * * * *